United States Patent [19]

Cramer et al.

[11] Patent Number: 5,606,465

[45] Date of Patent: Feb. 25, 1997

[54] INFORMATION TRACK FORMAT AND READING AND RECORDING APPARATUSES THEREFOR

[75] Inventors: Hugo A. J. Cramer; Albert M. A. Rijckaert, both of Eindhoven, Netherlands

[73] Assignee: U.S. Philips Corporation, New York, N.Y.

[21] Appl. No.: 354,566

[22] Filed: Dec. 13, 1994

[30] Foreign Application Priority Data

Dec. 13, 1993 [EP] European Pat. Off. .............. 93203491

[51] Int. Cl.$^6$ ................ G11B 5/09; G11B 5/584
[52] U.S. Cl. ............................. 360/48; 360/77.14
[58] Field of Search ................ 360/63, 64, 69, 360/71, 8, 27, 48, 77.14, 11.1, 32, 9.1, 33.1

[56] References Cited

U.S. PATENT DOCUMENTS

| | | | |
|---|---|---|---|
| 4,597,023 | 6/1986 | Rijckaert | 36/77.14 |
| 4,827,361 | 5/1989 | Yoshioka | 360/64 |
| 4,862,292 | 8/1989 | Enari et al. | 360/8 |
| 4,878,133 | 10/1989 | Takimoto | 360/64 |
| 4,963,991 | 10/1990 | Honjo | 358/310 |
| 5,032,931 | 7/1991 | Suzuki et al. | 360/17 |
| 5,159,500 | 10/1992 | Oguro et al. | 360/27 X |
| 5,245,483 | 9/1993 | Van Gestel | 360/40 |
| 5,245,485 | 9/1993 | Dunn et al. | 360/71 X |
| 5,247,396 | 9/1993 | Nagai et al. | 360/32 X |
| 5,379,433 | 1/1995 | Yamagishi | 360/60 X |
| 5,381,280 | 1/1995 | Lee | 360/64 X |

FOREIGN PATENT DOCUMENTS

| | | | |
|---|---|---|---|
| 0228240 | 7/1987 | European Pat. Off. | H04N 9/79 |
| 0495480 | 7/1992 | European Pat. Off. | H04N 5/782 |

*Primary Examiner*—W. Chris Kim
*Assistant Examiner*—Regina Y. Neal
*Attorney, Agent, or Firm*—Edward W. Goodman

[57] ABSTRACT

A reading apparatus for reading information recorded on a first longitudinal recording medium in the form of helical scanned information tracks, according to a first format in which the tracks have been recorded on the medium at a first track pitch and have a first track width, the information being read by the apparatus at a given tape velocity, the information being read from the first medium at a first bit rate, immediately adjacent tracks exhibiting alternately a first and a second azimuth angle, pilot tones being recorded in information tracks, the frequency of the recorded tones cycling through at least two different frequencies (f1, f2); and a second longitudinal recording medium recorded in the form of helical scanned information tracks, in accordance with a second, new, format in which the information track pitch is substantially twice the first track pitch, the information track width is greater than the first track width, the information being read from the second medium at substantially half the first bit rate, all of the information tracks on the second medium exhibiting the same azimuth angle, this angle being one of the first and second azimuth angles, immediately adjacent tracks containing pilot tones having mutually different ones of at the least two frequencies (f1, f2).

20 Claims, 5 Drawing Sheets

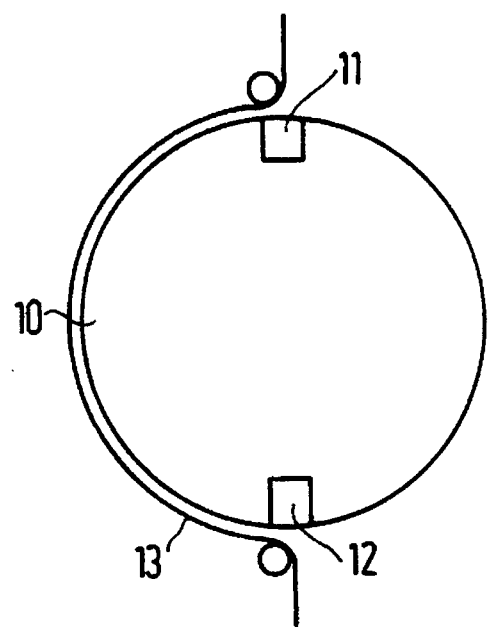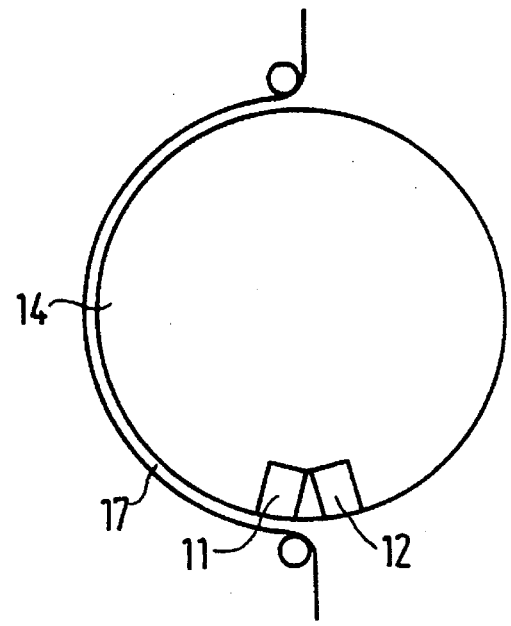
FIG.1a
PRIOR ART
FIG.1b
PRIOR ART

INFORMATION TRACK FORMAT AND READING AND RECORDING APPARATUSES THEREFOR

BACKGROUND OF THE INVENTION

1. Field of the Invention

The invention relates to a reading apparatus for reading a first type of digital information recorded on a first longitudinal recording medium in the form of information tracks recorded at an angle to the direction of travel of said recording medium, according to a first format in which said tracks have been recorded on said medium at a given angle to said direction of travel, at a first track pitch and have a first track width, said first type of information being readable by said apparatus at a given tape velocity during a normal mode of operation of said reading apparatus, whereby said first type of information can be read from said medium at a first bit rate, immediately adjacent tracks exhibiting mutually different azimuth angles, each track exhibiting either a first or a second azimuth angle, a pilot tone having one of at least two different frequencies being recorded in every second information track, the pilot tone frequency cycling through said at least two different frequencies, said reading apparatus comprising at least one read head adapted to read tracks having said first azimuth angle and at least one read head adapted to read tracks having said second azimuth angle.

2. Description of the Related Art

An apparatus of this type is disclosed in, for example, U.S. patent specification U.S. Pat. No. 4,597,023, which is incorporated herein by reference.

Such an apparatus may accurately track the recorded information tracks, by detecting a crosstalk component in the playback signal originating from a track that is read, this crosstalk signal being caused by the tracking signals recorded in the neighboring tracks. The crosstalk component is used to accurately position the reading head with respect to the track from which information is to be read.

The tapes which are used as the longitudinal recording medium in such an apparatus may be blank tapes on which a user (re)records material, or may be prerecorded software tapes.

Two exemplary types of tape which may be used are Particulate and Metal Evaporated (ME) tapes. Examples of particulate tapes are metal particle (MP) tape and barium ferrite tape.

The particulate type of tape has the advantage that it is cheaper than the metal evaporated type, but has the disadvantage that it performs more poorly in terms of parameters such as S/N ratio, etc. In attempting to use a cheaper tape to carry prerecorded software, this poorer performance leads to problems, as explained below.

In order to produce prerecorded software tapes, the following processes are possible :

"Fast Copy". In this process, a master tape and the tape to be recorded are placed in contact, and a copy of the information on the master tape is transferred to the copy tape by a thermomagnetic or by an anhysteretic process, for example. The copying is carried out at a tape speed higher than the nominal tape speed.

Alternatively, the master tape is placed in a master playing apparatus, and a number of slave recording apparatuses are used to record the information on copy tapes. This process is carried out at the nominal tape speed.

A characteristic of both these processes is that the signal-to-noise ratio on the copy tapes is reduced by several dB.

The solution to this problem, which is adopted in the VHS system, is that a master tape which has a higher signal level than the normally used tapes is chosen for use as a master tape. In the absence of such a master tape, the recording format must be changed. In the RDAT system, for example, the track width is greater than the head width, which results in an increased signal-to-noise ratio, thus compensating for the signal loss resulting from the high speed duplication process.

The disadvantage associated with the RDAT solution is that the linear tape speed is increased to make the track pitch greater, in order to accommodate the wider tracks. This causes an increase in the quantity of tape required, making the prerecorded software more expensive.

The use of the higher performance ME type of tape to carry prerecorded software (e.g. in the case of video tape: films, either for sale or for hire from a video library) results in increased duplication costs, as this type of tape cannot be used in the "Fast Copy" process.

SUMMARY OF THE INVENTION

It is an object of the present invention to improve the results of the fast copying process and to decrease the cost of copying.

According to a first aspect of the present invention, an apparatus of the above type is characterized in that said reading apparatus is further adapted to read a second type of digital information recorded on a second longitudinal recording medium in the form of information tracks recorded at an angle to the direction of travel of said second medium, in accordance with a second format in which the information track pitch is substantially twice said first track pitch, the information track width is greater than said first track width, said tracks are at said given angle to the direction of travel of said second medium, said tracks on said second medium being readable by said reading apparatus at said given velocity during a normal mode of operation of said reading apparatus, whereby said second type of information may be read from said second medium at substantially half said first bit rate, all of said information tracks on said second medium exhibiting the same azimuth angle, this angle being one of said first and second azimuth angles, all of said information tracks on said second medium having a pilot tone recorded therein, immediately adjacent tracks containing pilot tones having mutually different ones of said at least first and second frequencies, said adaptation to read said second type of information recorded in accordance with said second format, comprises the provision of control means, said control means controlling said apparatus to read information using only the read head or heads exhibiting the same azimuth angle as the information tracks present on the medium, and to use the other read head or heads only to provide tracking control.

Thus, a recording format is proposed, in which the track pitch is doubled, but the track width is increased to achieve a higher signal-to-noise ratio. The linear tape speed is not changed. The disadvantage caused by the resulting reduced bit rate may, if the latter proves inadequate, be offset by applying data compression prior to recording. If the original recording format required data compression, then the new format requires that the compression factor be doubled.

The proposed second format has the advantage that it allows the use of a longitudinal recording medium of lower quality according to a recording standard for which it would otherwise not be suited, because of the increased track width.

The proposed format is fully compatible with the above described tracking control technique.

If video information is to be recorded, advantage may be taken of the fact that intraframe coding of video information, e.g., as specified in the MPEG proposal, allows a bit rate compression to be achieved which can be reversed using a relatively cheap and simple decoder situated, for example, in a consumer VTR.

The first and second formats may be recorded on higher and lower performance versions, respectively, of the same type of medium. Such versions of the same tape type may be distinguished during manufacturing, e.g. by having passed different quality tests.

The first and second formats may be recorded on different media, whereby the first format is recorded on a higher quality and the second format on a lower quality medium, respectively. To this end, the reading apparatus is further characterized in that it is adapted to read information from a first type of medium used as said first medium and from a second type of medium used as said second medium.

Moreover, the reading apparatus may be further characterized in that it is adapted to read, as said first and second type of medium, a higher quality recording medium and a lower quality recording medium, respectively.

Further, the reading apparatus may be adapted to read, as said first and second type of recording media, magnetic tapes of the metal evaporated and particulate type, respectively.

Preferably, the reading apparatus is further characterized by means adapted to recognize which of said first and second formats the information being read has, and for generating a control signal when the second format is recognised.

Consequently, the reading apparatus can automatically be set to read the inventive format.

According to a preferred embodiment, the reading apparatus is further characterized by signal processing means adapted to respond to the control signal by outputting the second type of information without increasing the bit rate thereof.

This modification is useful if the information to be recorded is intraframe coded video, as discussed previously. It is probable that future television receivers will include an intraframe decoder, and in this case, a duplicate decoder in the reading apparatus may be dispensed with.

According to another embodiment, the reading apparatus is further characterized by signal processing means adapted to respond to the control signal by outputting the second type of information after performing bit rate modification.

Further, the reading apparatus of this embodiment may be further characterized in that the signal processing means also subject the first type of information to bit rate modification, and in that the bit rate modification results in a bit rate modified such that it is multiplied by a factor m, the value of m being twice as high when the second type of information is read as when the first type of information is read.

Dependent upon the type of information to be recorded, it may or may not be the case that it needs compressing to match the bit rate achievable when recorded according to the first format. Whichever of these cases is valid, the second format can accommodate substantially half the bit rate which the first format can accommodate.

According to a second aspect of the invention, a recording medium carrying the second type of information recorded in the second format is provided.

Preferably the medium is of lower quality than the first recording medium and may thus be of the particulate type.

Furthermore, the medium is preferably used to store video information. Moreover such information preferably represents prerecorded software.

In order to facilitate the automatic recognition of the type of recorded information as set out hereinabove, the recording medium is preferably further characterized in that the information stored thereon includes an indication identifying the second format.

As an alternative, the recording medium may be further characterized by being included in a housing which incorporates an indication identifying the second format.

This indication can be in mechanical, optical or electrical form, for example. In the latter case, a chip storing identifying information and provided with necessary contacts could be included in the housing.

According to a third aspect of the invention, a recording apparatus for recording the second format on the second recording medium comprising at least one recording head having a first one of said first and second azimuth angles, and being characterized by means for adding a pilot tone to every information track to be recorded, such that immediately adjacent tracks contain pilot tones having mutually different ones of said first and second frequencies, is provided.

It is possible to modify a recording apparatus designed to record the first type of information and including pairs of heads having different azimuth angles. To this end, the recording apparatus may be further characterized by control means for generating a recording control signal, and by at least one recording head having a second one of said first and second azimuth angles, and in that the head or heads having one of said first and second azimuth angles are enabled or disabled in dependence upon said recording control signal.

On the other hand, the recording apparatus may include only heads having one azimuth angle, and is thus characterized in that it only comprises a recording head or heads having said first one of said first and second azimuth angles.

As pointed out above, the information to be recorded may need to be reduced in bit rate by data compression in order to be recorded as the second type of information. Thus, the recording apparatus may be further characterized by recording signal processing means for subjecting said second type of information to data compression prior to recording, in order to reduce the bit rate necessary to represent said information.

In order to facilitate the previously mentioned automatic recognition of recorded information type, the recording apparatus may be further characterized by means for including in the recorded information tracks an indication identifying the second format.

BRIEF DESCRIPTION OF THE DRAWINGS

Further objects and advantages of the present invention will become apparent from the detailed description which follows together with the drawings, in which:

FIGS. 1a and 1b show conventional magnetic head arrangements.

DESCRIPTION OF THE PREFERRED EMBODIMENT

FIGS. 1a and 1b show two exemplary conventional arrangements of magnetic heads used for recording and reading information on and from a longitudinal recording medium.

FIG. 1a shows the situation in which two heads 11 and 12 are situated 180 degrees apart on the circumference of drum 10, in the same plane. The magnetic tape 13 constituting the above-mentioned medium is wrapped around the drum 10 in order to perform the well known process of helical scanning of the tape. For this purpose, the tape is wrapped around the drum such that, for example, a 180 degree "wrap angle" is achieved, as shown in the figure.

In operation, as the drum 10 rotates, a first one of the heads 11 and 12 will be scanned across the tape, thus describing a trajectory at an angle to the direction of travel of the tape. When the rotation of the drum 10 causes the first head to no longer be adjacent to the tape, the second head will then, by virtue of the 180 degree separation, be adjacent to the tape, and follow a similar trajectory to the first head but at an adjacent tape portion, by virtue of the tape being transported.

A first, conventional tape format which can be read or recorded using the arrangement of heads described above is shown in FIG. 2. All dimensions in the figure are exemplary, and are expressed in micrometer. It should be appreciated that a simplified representation has been chosen, and that the tracks will, in reality, be at an angle to the direction of the travel of tape 13.

Figure 2:
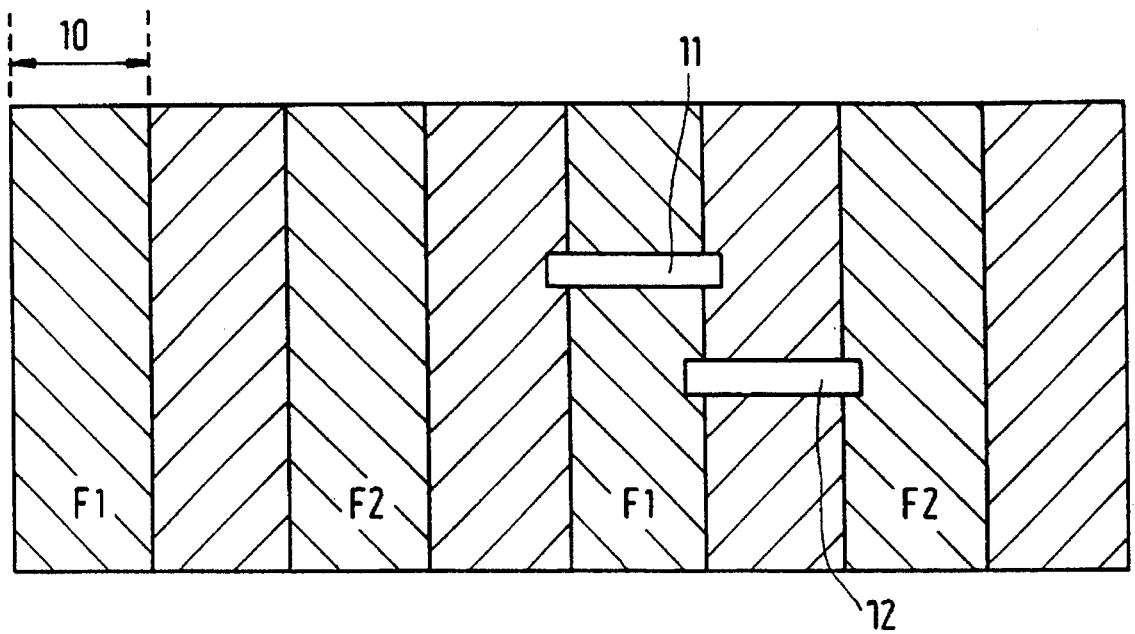
FIG. 2 shows a first, conventional track format, which may be written on or read from a recording medium using the configurations shown in FIGS. 1a and 1b

The arrangement of FIG. 1b is another possible arrangement with which the tape format of FIG. 2 may be read or recorded. This arrangement differs from that of FIG. 1a in that the heads 11 and 12 are adjacent to each other in the circumferential direction of the drum 14. In order to be compatible with the FIG. 1a arrangement, the heads 11 and 12 are no longer in the same plane but are in fact separated in the axial direction of the drum 14, by an amount equal to the track pitch, i.e. the separation between adjacent tracks of FIG. 2.

The standard tape format shown in FIG. 2 will now be briefly discussed. It should be noted that the situation illustrated is the reproduction of previously recorded material.

The information is recorded on the tape in an overlapping fashion. It is for this reason that the heads 11 and 12 are wider than the tracks to be read. The use of reading and recording heads with different azimuth angles ensures that the tracks are recorded without a guard band, but nevertheless the information of adjacent tracks does not interfere during reading. This difference in azimuth angle is illustrated in FIG. 2 by different hatching, as is also the case on FIG. 3, to be discussed hereinafter.

A further feature of the first format shown in FIG. 2 is the recording, in every second track, of a low frequency pilot tone. The frequency alternates between frequencies f1 and f2. On reading from the tape, the heads may be caused to track the tape such that they are centrally positioned with respect to the tracks. This is achieved by detecting, in the signal emanating from the head not reading tracks containing pilot tones (head 12 in the case illustrated), the amplitude at the frequencies f1 and f2. When the correct relationship between these amplitudes exists, the heads are centered on the tracks.

It should be noted that various other known tracking methods may be employed, employing inter alia, four frequencies, one in every track.

Figure 3:
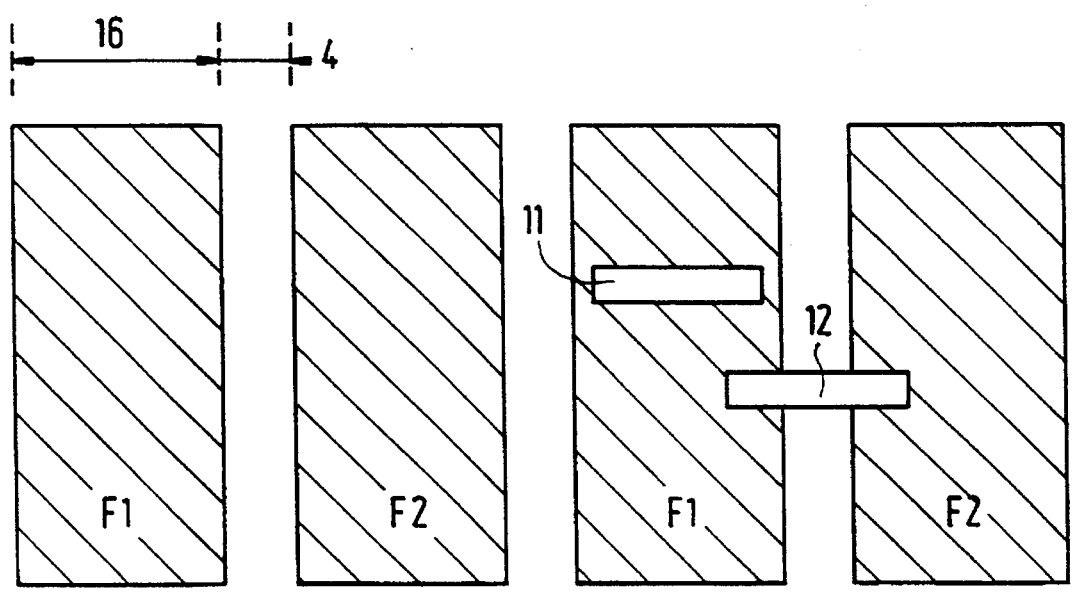
FIG. 3 shows a second track format, which is proposed according to the second aspect of the present invention.

Attention is now turned to the second tape track format illustrated in FIG. 3, which forms one aspect of the present invention. As noted in respect of FIG. 2, all dimensions are exemplary and are expressed in micrometer.

The second format is the same as that of FIG. 2 in respect of the speed at which the tape is transported in normal operation and the angle at which the tracks are inclined.

The new format utilizes substantially twice the track pitch depicted in FIG. 2, and a track width which is wider than that shown in FIG. 2.

The use of wider tracks allows an improvement in signal-to-noise ratio to be achieved upon reproduction. This opens up the possibility of using the previously mentioned MP tape to carry prerecorded software, since the master tape will now provide a sufficiently strong signal to be utilized in the fast copy process. If such tape were used in the fast copy process, but carrying the standard track format of FIG. 2, the original signal would not be strong enough to provide a usable signal on the copy, which, as pointed out earlier, exhibits a lower signal level than the master tape.

In order to maintain compatibility with the standard track format with respect to parameters such as the track angle, the tape transport speed must be the same during recording and reproducing of both the first and second formats.

However, if the tape speed is not changed, this implies that only one of the heads used to read the standard track format can be used to read the proposed track format, if the width of tape is not changed, and if the information is written in the same configuration within a track in both formats. An example of the way in which information is recorded within tracks is disclosed in the context of digital video recording in EP-A-0 492 704 corresponding to U.S. Pat. No. 5,245,483, which is incorporated herein by reference. This means that the bit length of the bits recorded in the tracks are the same in both formats. This of course implies a reduction by a factor of two of the amount of information which may be carried on a given quantity of tape.

It will thus be seen that the first format can be used to record a first, higher dam rate, type of information, and that the second format can be used to record a second, lower data rate, type of information.

In the case of video recording, this is not expected to be a problem, since the MPEG coding standard offers video signals which have been compressed to a sufficient extent. Although a (further) data reduction is needed, this does not necessarily require a more powerful data expansion circuit in the reproducing apparatus as one can provide a coding which requires, on the one hand, a relatively complex and expensive encoder and, on the other hand, a relatively simple and inexpensive decoder. The cost implied by the capacity reduction is therefore carried by the program provider who, moreover, does not need a large number of recording devices. The manufacturer of the reproducing apparatus and the consumer, on the other hand, are confronted with a relatively small cost increase and price increase, respectively.

The proposed format is also entirely compatible with the known tracking methods discussed above, as will become apparent from the detailed description of the reading device according to the first aspect of the present invention and discussed in detail hereinbelow.

Figure 4:
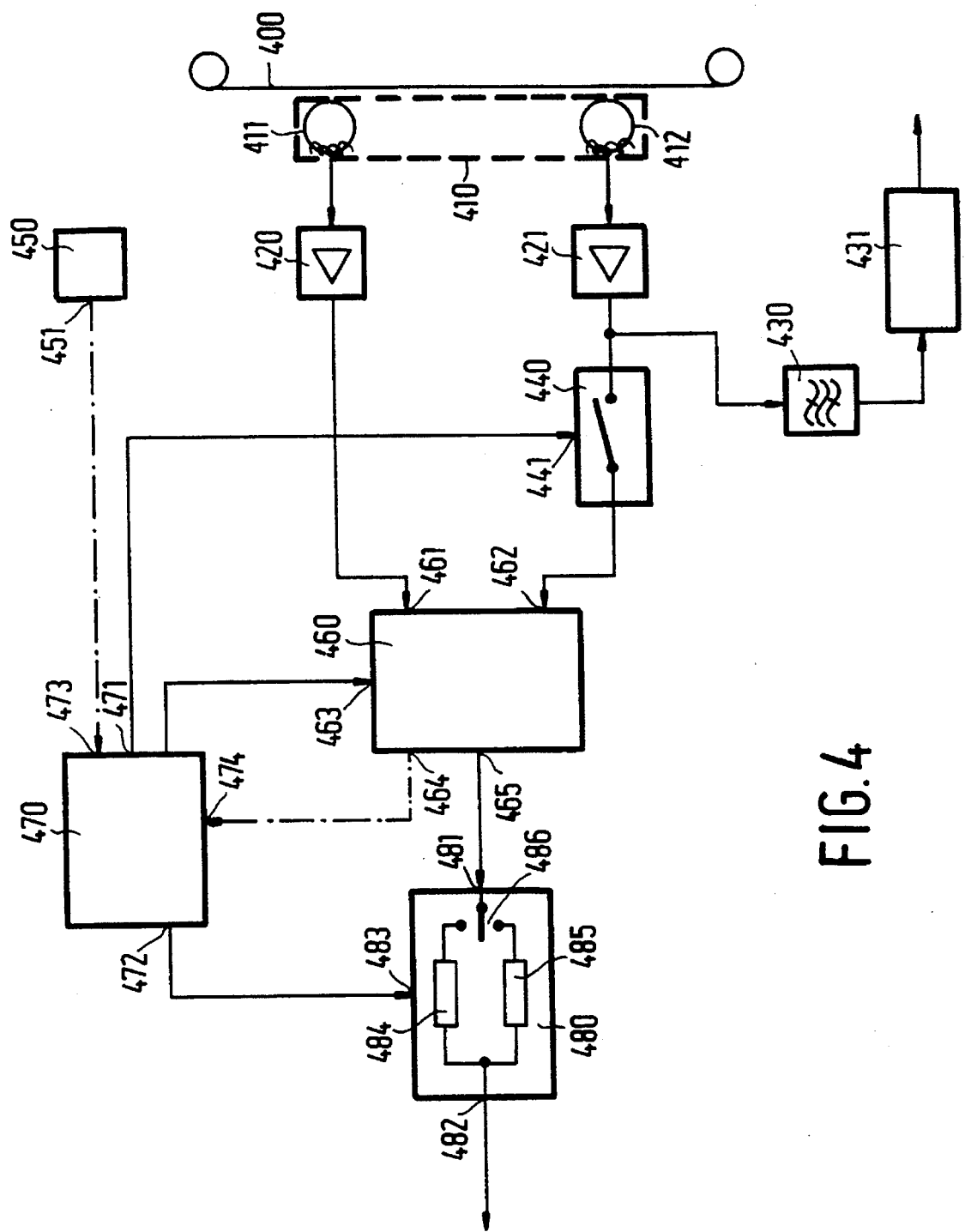
FIG. 4 shows a reading apparatus according to the first aspect of the present invention.

A reading device in accordance with the first aspect of the invention is illustrated in block diagram form in FIG. 4.

The magnetic tape may be of a first, higher quality type, in which case the signals thereon will have been recorded in the format shown in FIG. 2.

The magnetic tape may also be of a second, lower quality type, in which case the signal thereon will have been recorded in the format shown in FIG. 3.

It should be noted that it is also possible that the second format is recorded on the first type of tape.

The tape is wrapped around a head drum 410, shown schematically in the figure, on which are mounted two read heads 411 and 412, with different azimuth angles. The azimuth angles are chosen such that head 411 has the same azimuth angle as the head which was used to record onto tape 400, when the information tracks on the tape are in the format illustrated in FIG. 3.

The signals picked up by the heads 411 and 412 are amplified in amplifiers 420 and 421.

The output signal of amplifier 421 is fed to a filter 430, the passband of which is chosen to include the frequency or frequencies used for the pilot tones. A detector 431 detects a predetermined relationship between the amplitudes of pilot signals recorded in the information tracks, and outputs a control signal for use as a tracking control signal. Tracking control can be carried out in any of a variety of well known ways, and will not therefore be discussed in further detail.

The output of amplifier 421 is coupled to an input of a switch 440. When the first tape format is read, the switch 440 is closed, so that in this case the signals from both the amplifiers 420 and 421 are available for further processing. The control signal for the switch is issued from a control unit 470, as will be discussed hereinbelow in more detail.

Unit 460 receives the output of amplifier 420 and switch 440 at its inputs 461 and 462, respectively. Unit 460 performs channel decoding and therefore functions to recreate a single signal from the signals read from different information tracks by the heads 411 and 412. Its exact function depends upon how the original signal has been recorded.

As a modification, switch 440 could be realized as part of unit 460.

The output of unit 460 is fed to the input 481 of a unit 480. Unit 480 comprises decompression circuits 484 and 485, and switch 486, which is controlled by the control signal received on input 483 from output 472 of control unit 470. Circuit 484 decompresses the first type of information, whereas circuit 485 decompresses the second type of information. If the data capacity of the first format can accommodate the information to be recorded without compression, circuit 484 may be replaced by a through connection. Otherwise, the decompression factor of circuit 485 is twice as high as that of circuit 484.

If a tape carrying the second format is read, then control unit 470 issues a control signal from its output 471, which is applied to the control input 441 of switch 440, causing the switch to interrupt the connection between amplifier 421 and unit 460.

The connection between amplifier 421 and filter 430 is not interrupted, and thus the tracking control function can still be carried out. With reference to FIG. 3, it will be seen that the tracking of head 412 by maintaining a predetermined relationship between the amplitudes of tones f1 and f2, i.e., in the same manner as in the case of reading the FIG. 2 format, will cause this head to be between tracks, and head 411 to be centered on an information track.

Returning now to FIG. 4, only head 411 and amplifier 420 will produce a useful output signal, and thus control unit 470 is adapted to issue a control signal to the control input 463 of unit 460, to enable the latter to produce a signal at its output 465 on the basis of the signal at input 461 alone.

In order to make the reading apparatus more user friendly, a preferred embodiment thereof is adapted to recognize which format has been used to record information on the tape which has been inserted into the apparatus.

Two possible realizations of such an adaptation are included in FIG. 4 and indicated by dotted chain line connections.

The recorded information may be supplemented by an indication of the second tape format. In this case, unit 460, for example, may be adapted to recognize this indication, and inform the control unit 470 of the tape format via output 464.

It is also possible to recognize the second tape format by detecting an indicating feature incorporated in or on the tape housing or cassette. Such an indication may be optical, mechanical or electrical in nature. In the latter case, a chip may be included in the housing.

Detector 450 is adapted to detect such an indicating feature, and supplies, at its output 451 a signal to input 473 of control unit 470, to inform the latter that the second tape format is being read.

It will be seen from the foregoing description that the inventive track format requires relatively minor alterations to known reading apparatuses, namely the addition of switch 440, and the adaptation of the control unit normally present may be adapted to include functions equivalent to those of control unit 470. Moreover, unit 480 may already be present in the form of circuit 484, and in this case need simply to be modified by the addition of circuit 485 and switch 486. Circuit 485 may be of simple construction, as pointed out earlier in the discussion of coding standards such as MPEG. As an option, further modification may be made to unit 460, or detector 450 may be added.

Figure 5A:
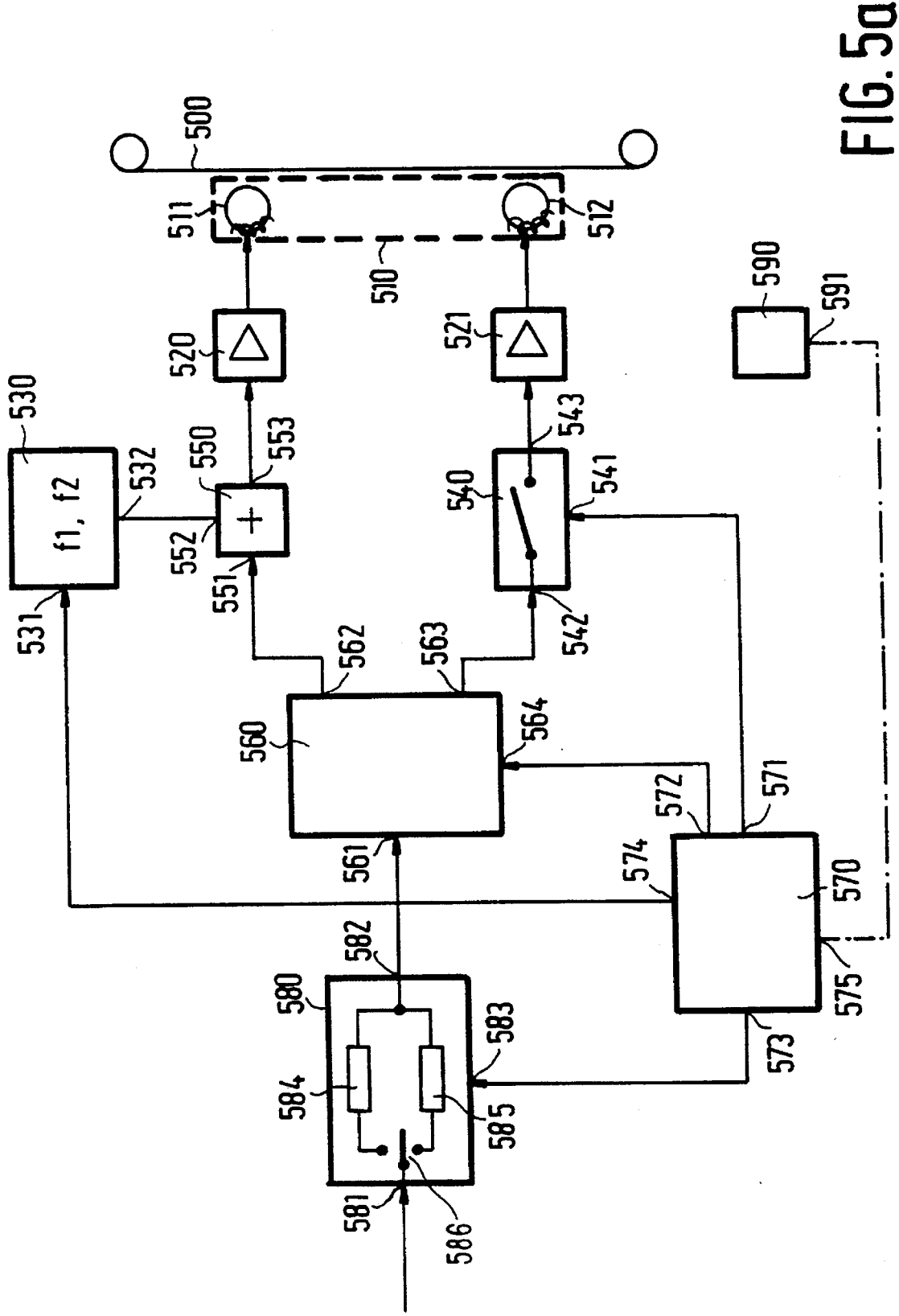
FIGS. 5a and 5b, show recording apparatuses according to preferred embodiments of the third aspect of the present invention.

A recording apparatus according to a preferred embodiment the third aspect of the present invention is illustrated in FIG. 5a, and will now be described.

The apparatus illustrated in FIG. 5a is obtained by modifying a conventional two head recording apparatus, i.e. an apparatus in which recording heads are arranged as, for example, depicted in FIG. 1a or FIG. 1b.

If a recording medium 500 is to be recorded using the first format according to FIG. 2, both of the recording heads 511 and 512 mounted on head drum 510 will be used.

In this situation, control unit 570 outputs a signal on its output 571 to the control input 541 of switch 540, which, as a result, closes. Further, control unit 570 outputs a control signal on its output 572 to input 564 of unit 560. Unit 560 performs channel encoding and also divides the input signal into two channels for recording, the division being as described in the context of FIG. 4.

The output signal from output 562 of unit 560 is fed to input 55 1 of an adder 550. The other input of adder 550 is connected to the output 532 of pilot tone generating circuit 530. The latter circuit receives on input 531 a control signal issued from output 574 of control unit 570.

In the case of recording the first tape format, this latter control signal causes the circuit 530 to alternately generate pilot tones with frequencies f1 and f2, at timings which result in a pilot tone being inserted in every other track. As was discussed above, other pilot tone schemes may be utilized without departing from the scope of the present invention.

The signals output via output 553 of adder 550 and by output 543 of switch 540 are amplified in amplifiers 520 and 521, respectively, and subsequently fed to recording heads 511 and 512, respectively. Heads 511 and 512 have different azimuth angles from each other. Head 511 has the same azimuth angle as head 11 and head 512 the same as head 12.

The information is recorded on tape 500 by the heads 511 and 512 in an overlapping fashion, as is known, which results in tracks which are actually narrower than the recording heads, and than the reading heads, since the same heads are generally used for both recording and reading purposes.

Unit 580, by analogy with unit 480, comprises compression circuits 584 and 585 for the first and second information types, respectively, and switch 586, controlled by a control signal received on input 583 from output 573 of control unit 570. By analogy with circuits 484 and 485, circuit 585 compresses its input twice as much as circuit 584, and as explained, circuit 584 may be replaced by a through connection.

If, instead, a tape is to be recorded using the second format, then only one of the recording heads is utilized. The head in question is that one which exhibits the same azimuth angle as the head 11 used to read the second type of tape.

The control unit 570 outputs via its output 571 a signal to the control input 541 of switch 540, instructing the latter to open, as a result of which, amplifier 521 and hence head 512 receive no input signals.

The control unit 570 also outputs via output 572 a control signal to unit 560, to instruct the latter that the signal input thereto is to be recorded in a single channel.

In this apparatus, the requirement according to the second format that the tracks be wider than those of the first format may simply be fulfilled by the fact that the information is not recorded in overlapping fashion. In this case, the tracks on the tape will not be wider than the read heads, as depicted in FIG. 3. The advantages brought by the second format are, nevertheless, still obtained.

The inventive format illustrated in FIG. 3 requires that every track include a pilot signal. Therefore, control unit 570 outputs via output 574 a control signal to circuit 530 to instruct the latter to add an appropriate frequency pilot to each track.

In order to make the reading apparatus of FIG. 4 more user friendly, it has been suggested above that the second type of tape include an identification identifying it as such.

In the case of the recording apparatus of FIG. 5a, the addition of a signal to the data to be recorded is realized by unit 560, in response to the corresponding control signal from control unit 570.

If, on the other hand, the indication is included in or on the housing in optical, mechanical or electrical form, then a detector 590 may be used to detect the presence of a tape suited to the second tape format and, via its output 591, send a signal to the input 575 of control unit 570, in response to which, the control unit 570 controls the various other means accordingly, with the intention of preventing the recording of information in the first format on an inferior recording medium.

The apparatus of FIG. 5a is a modification of a standard recording apparatus. It is also possible to construct a recording apparatus dedicated to recording prerecorded software according to the second format. Such an apparatus may take the form illustrated in FIG. 5b.

Figure 5B:
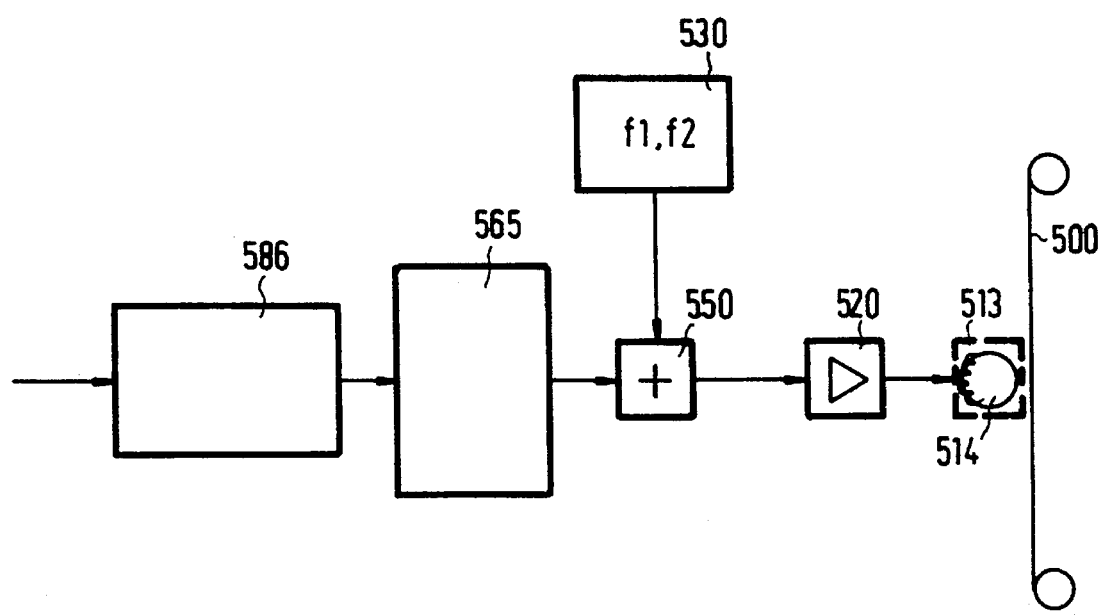

In FIG. 5b, heads 511 and 512 and drum 510 are replaced by a single head 514 and drum 513. Head 514 may be wider than heads 511 and 512 and heads 411 and 412. More specifically, in order to obtain the specific format depicted in FIG. 3, the width of the head 514 equals the width of the tracks in that Figure. Thus, head 514 is wider than heads 511 and 512 of the apparatus illustrated in FIG. 5a. Switch 540 and amplifier 521, detector 590 and control unit 570 are all dispensed with.

Unit 580 is replaced by unit 586, which comprises a single compression circuit, performing, for example, MPEG compression, and any further compression which may be necessary for the second format.

Figure 6:
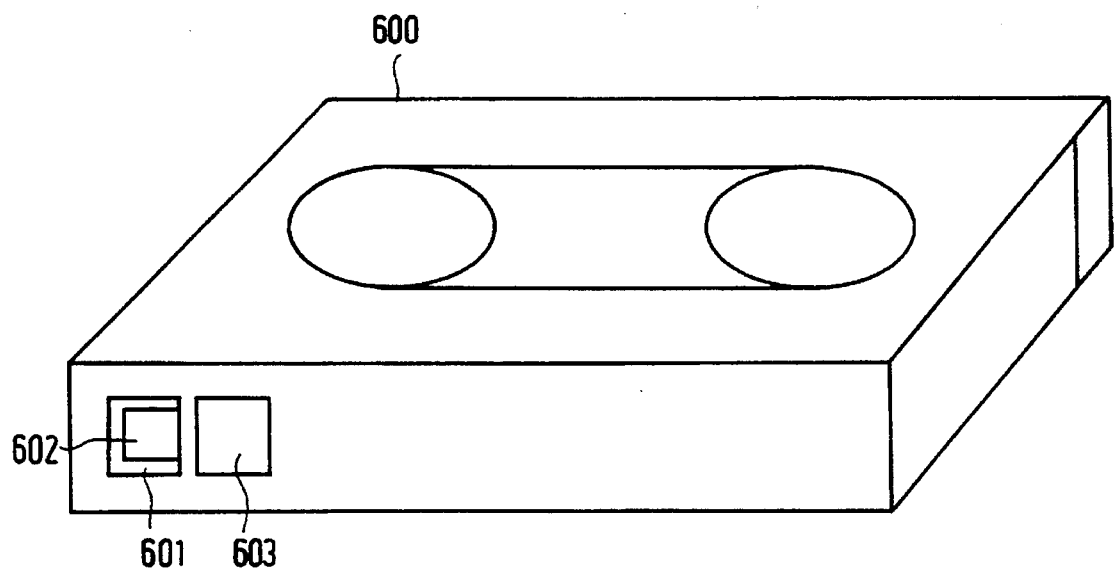
FIG. 6 shows a housing for a recording medium, according to a preferred embodiment of the second aspect of the present invention.

FIG. 6 shows, by way of illustration, how an indication of the type of recording medium can be indicated on or in the housing of that medium.

The situation illustrated is that of a video tape in a VHS style cassette 600. Such a cassette includes a recess 601. If recess 601 is obscured by a tab 602, the medium in the housing may be (re)recorded. If the tab is absent, the medium may only be read.

The optical, mechanical or electrical indication may be included in an adjacent area 603. This is not a limiting example, and the indication may be included in any convenient location.

While the present invention has been described with respect to preferred embodiments thereof, it is to be understood that these are not limitative examples. Thus, various modifications may become apparent to those skilled in the art, without departing from the scope of the invention, as defined in the appended claims.

We claim:

1. A reading apparatus for reading a first type of digital information recorded on a first longitudinal recording medium in the form of information tracks recorded at an angle to the direction of travel of said first longitudinal recording medium, according to a first format in which said tracks have been recorded on said first longitudinal recording medium at a given angle to said direction of travel, at a first track pitch and have a first track width, said first type of information being readable by said apparatus at a given tape velocity during a normal mode of operation of said reading apparatus, whereby said first type of information can be read from said first longitudinal recording medium at a first bit rate, immediately adjacent tracks exhibiting mutually different azimuth angles, said tracks exhibiting, alternately, a first azimuth angle and a second azimuth angle, a pilot tone having one of at least two different frequencies being recorded in every second information track, the pilot tone frequency cycling through said at least two different frequencies, said reading apparatus comprising at least one read head adapted to read tracks having said first azimuth angle and at least one read head adapted to read tracks having said second azimuth angle, characterized in that said reading apparatus is further adapted to read a second type of digital information recorded on a second longitudinal recording medium in the form of information tracks recorded at an angle to the direction of travel of said second longitudinal recording medium, in accordance with a second format in which the information track pitch is substantially twice said first track pitch, the information track width is greater than said first track width, said tracks are at said given angle to the direction of travel of said second longitudinal recording medium, said tracks on said second longitudinal recording medium being readable by said reading apparatus at said given velocity during a normal mode of operation of said reading apparatus, whereby said second type of information maybe read from said second longitudinal recording medium at substantially half said first bit rate, all of said information tracks on said second longitudinal recording medium exhibiting the same azimuth angle, this angle being one of said first and second azimuth angles, all of said information tracks on said second longitudinal recording medium having a pilot tone recorded therein, immediately adjacent tracks containing pilot tones having mutually different ones of said at least first and second frequencies, wherein, in order to read said second type of information recorded in accordance with said second format, said reading apparatus comprises control means, said control means controlling said apparatus to read information using only the read head or heads exhibiting the same azimuth angle as the information tracks present on the second longitudinal recording medium, and to use the other read head or heads only to provide tracking control.

2. A reading apparatus as claimed in claim 1, characterized in that said reading apparatus is adapted to read information from a first type of medium used as said first longitudinal recording medium and from a second type of medium used as said second longitudinal recording medium.

3. A reading apparatus as claimed in claim 2, characterized in that said reading apparatus is adapted to read, as said first and second types of medium, a higher quality recording medium and a lower quality recording medium, respectively.

4. A reading apparatus as claimed in claim 3, characterized in that said reading apparatus is adapted to read, as said first and second types of recording media, magnetic tapes of the metal evaporated and particulate types, respectively.

5. A reading apparatus as claimed in claim 1, characterized in that said reading apparatus further comprises means for recognizing which format, of said first and second formats, the information being read has, and for generating a control signal when the second format is recognized.

6. A reading apparatus as claimed in claim 5, characterized in that said reading apparatus further comprises signal processing means for responding to the control signal by outputting the second type of information without increasing the bit rate thereof.

7. A reading apparatus as claimed in claim 5, characterized in that said reading apparatus further comprises signal processing means for responding to the control signal by outputting the second type of information after performing bit rate modification.

8. A reading apparatus as claimed in claim 7, further characterized in that the signal processing means also subjects the first type of information to bit rate modification, and in that the bit rate modification results in a bit rate modified such that the bit rate is multiplied by a factor m, the value of m being twice as high when the second type of information is read as when the first type of information is read.

9. A longitudinal recording medium comprising a type of information in the form of information tracks recorded at an angle to a direction of travel of said longitudinal recording medium, said longitudinal recording medium for use in a recording and reproducing system in which a known type of digital information is recorded on a known longitudinal recording medium in the form of information tracks recorded at an angle to the direction of travel of said known longitudinal recording medium, according to a known format in which said tracks have been recorded on said known longitudinal recording medium at a given angle to said direction of travel, at a known track pitch and at a known track width, said known type of digital information being readable by reading means in a reading apparatus at a given tape velocity during a normal mode of operation of said reading apparatus, whereby said known type of information can be read from said known longitudinal recording medium at a known bit rate, immediately adjacent tracks exhibiting mutually different azimuth angles, said tracks exhibiting, alternately, a first azimuth angle and a second azimuth angle, a pilot tone having one of at least two different frequencies being recorded in every second information track, the pilot tone frequency cycling through said at least two different frequencies, said longitudinal recording medium being in accordance with a format in which the information track pitch is substantially twice said known track pitch, the information track width is greater than said known track width, said tracks being at said given angle to the direction of travel of said longitudinal recording medium, said tracks on said longitudinal recording medium being readable by said reading means in said reading apparatus at said given velocity during a normal mode of operation of said reading apparatus, whereby said type of information is read from said longitudinal recording medium at substantially half said known bit rate, all of said information tracks on said longitudinal recording medium exhibiting the same azimuth angle, this angle being one of said first and second azimuth angles, all of said information tracks on said longitudinal recording medium having a pilot tone recorded therein, and immediately adjacent tracks containing pilot tones having mutually different ones of said at least first and second frequencies.

10. A longitudinal recording medium as claimed in claim 9, characterized in that said longitudinal recording medium is of lower quality than the known longitudinal recording medium.

11. A longitudinal recording medium as claimed in claim 9, characterized in that said longitudinal recording medium is of the particulate type.

12. A longitudinal recording medium as claimed in claim 9, characterized in that said longitudinal recording medium is used to store video information.

13. A longitudinal recording medium as claimed in claim 9, characterized in that said longitudinal recording medium is used to store prerecorded software.

14. A longitudinal recording medium as claimed in claim 9, characterized in that the information stored on said longitudinal recording medium includes an indication identifying the format.

15. A longitudinal recording medium as claimed in claim 9, characterized in that said longitudinal recording medium is included in a housing which incorporates an indication identifying the format.

16. A recording apparatus for recording the second format specified in claim 1 on the second longitudinal recording medium, said recording apparatus comprising at least one recording head having a first one of said first and second azimuth angles, characterized in that said recording apparatus further comprises means for adding a pilot tone to every information track to be recorded, such that immediately adjacent tracks contain pilot tones having mutually different ones of said first and second frequencies.

17. A recording apparatus as claimed in claim 16, characterized in that said recording apparatus further comprises control means for generating a recording control signal, and at least one recording head having a second one of said first and second azimuth angles, and in that the head or heads having one of said first and second azimuth angles are enabled or disabled in dependence upon said recording control signal.

18. A recording apparatus as claimed in claim 16, characterized in that said recording apparatus only comprises a recording head or heads having said first one of said first and second azimuth angles.

19. A recording apparatus as claimed in claim 16, characterized in that said recording apparatus further comprises recording signal processing means for subjecting said second type of information to data compression prior to recording, in order to reduce the bit rate necessary to represent said information.

20. A recording apparatus as claimed in claim 16, characterized in that said recording apparatus further comprises means for including in the recorded information tracks an indication identifying the second format.

\* \* \* \* \*